(12) United States Patent
Schreier et al.

(10) Patent No.: US 10,521,430 B1
(45) Date of Patent: Dec. 31, 2019

(54) DYNAMIC SELECTION OF QUERY EXECUTION OPERATORS

(71) Applicant: Tableau Software, Inc., Seattle, WA (US)

(72) Inventors: Michael Schreier, Munich (DE); Thomas Neumann, Munich (DE); Viktor Leis, Munich (DE); Alfons Kemper, Munich (DE); Tobias Muehlbauer, Munich (DE); Jan Finis, Munich (DE)

(73) Assignee: Tableau Software, Inc., Seattle, WA (US)

( * ) Notice: Subject to any disclaimer, the term of this patent is extended or adjusted under 35 U.S.C. 154(b) by 227 days.

(21) Appl. No.: 15/650,658

(22) Filed: Jul. 14, 2017

Related U.S. Application Data

(60) Provisional application No. 62/418,246, filed on Nov. 6, 2016, provisional application No. 62/528,903, filed on Jul. 5, 2017.

(51) Int. Cl.
  *G06F 17/30*  (2006.01)
  *G06F 16/2455*  (2019.01)
  *G06F 16/2453*  (2019.01)
  *G06F 16/22*  (2019.01)

(52) U.S. Cl.
  CPC .. *G06F 16/24552* (2019.01); *G06F 16/24542* (2019.01); *G06F 16/24557* (2019.01); *G06F 16/24561* (2019.01); *G06F 16/2282* (2019.01); *G06F 16/2455* (2019.01); *G06F 16/24544* (2019.01)

(58) Field of Classification Search
  CPC ........... G06F 16/24542; G06F 16/2455; G06F 16/24549; G06F 16/2282; G06F 16/2365; G06F 16/24539; G06F 16/24544; G06F 16/2456; G06F 16/24537
  USPC .................. 707/718, 737, E17.017, 714, 720
  See application file for complete search history.

(56) References Cited

U.S. PATENT DOCUMENTS

| | | | | |
|---|---|---|---|---|
| 2011/0313999 A1* | 12/2011 | Bruno | ............... | G06F 16/24537 707/718 |
| 2012/0136850 A1* | 5/2012 | Barsness | ........... | G06F 16/24561 707/720 |
| 2013/0091122 A1* | 4/2013 | Salch | .................. | G06F 21/6263 707/718 |
| 2014/0095472 A1* | 4/2014 | Lee | ................... | G06F 16/24542 707/714 |

(Continued)

*Primary Examiner* — Dangelino N Gortayo
(74) *Attorney, Agent, or Firm* — Morgan, Lewis & Bockius LLP

(57) ABSTRACT

A method dynamically selects query execution operators for a database engine. The database engine receives a query and parses the query to form a query execution tree. The engine creates a first executable plan that includes in-memory operators, which execute within the volatile memory. While executing a first in-memory operator, the engine detects insufficient memory to complete the execution and aborts the execution. The engine then recompiles the query execution tree to form a second executable plan, which includes spooling operators. Each spooling operator executes within a fixed volatile memory budget. The engine executes the second executable plan, including the plurality of spooling operators, to identify a set of results from the database that is responsive to the query, and returns the results.

20 Claims, 13 Drawing Sheets

(56) References Cited

U.S. PATENT DOCUMENTS

2016/0350371 A1* 12/2016 Das ................... G06F 16/24542
2017/0031975 A1*  2/2017 Mishra ................ G06F 16/2454
2018/0024922 A1*  1/2018 Hassan ............. G06F 16/24561
                                                                 711/118
2018/0121426 A1*  5/2018 Barsness ................... G06F 9/50

* cited by examiner

938 Recompile the query execution tree to form a second executable plan.

940 The second executable plan includes a plurality of spooling operators instead of in-memory operators. Each of the spooling operators executes within a respective fixed volatile memory budget and is configured to swap to non-volatile memory according to the respective fixed volatile memory budget.

942 Replace the first in-memory operator with a first spooling operator in the second executable plan.

944 the first spooling operator utilizes a partitioned hash table that swaps partitions between volatile memory and non-volatile memory.

946 The second executable plan also includes one or more in-memory operators.

948 Recompile all of the query execution tree except for the first portion.

950 Execute the second executable plan to identify a set of results from the database that is responsive to the query.

952 Reuse the stored intermediate results corresponding to the first portion.

954 Return the set of results.

Figure 9C

DYNAMIC SELECTION OF QUERY EXECUTION OPERATORS

RELATED APPLICATIONS

This application claims priority to U.S. Provisional Application Ser. No. 62/418,246, filed on Nov. 6, 2016, entitled "High Performance Relational Database System," which is incorporated by reference herein in its entirety. This application also claims priority to U.S. Provisional Application Ser. No. 62/528,903, filed on Jul. 5, 2017, entitled "Elimination of Common Subexpressions in Complex Database Queries," which is incorporated by reference herein in its entirety.

TECHNICAL FIELD

The disclosed implementations relate generally to database systems, and more specifically to system features that improve query execution performance.

BACKGROUND

Data visualization applications enable a user to understand a data set visually, including distribution, trends, outliers, and other factors that are important to making business decisions. Some data sets are very large or complex, and include many data fields. Various tools can be used to help understand and analyze the data, including dashboards that have multiple data visualizations.

Data is commonly stored in a relational database and accessed by queries using a prescribed syntax (e.g., SQL). As volatile memory has become less expensive, database system may cache more data in memory to improve performance. Some database systems attempt to work almost entirely in memory, and take advantage of the high speed access. However, even with a large amount of available volatile memory, complex queries that access large tables of data may expand beyond the available memory. This typically leads to either aborting the execution (and no data is returned to the requester) or leads to thrashing while swapping to disk. Running out of memory is also more likely when a server is running many queries simultaneously (e.g., queries received from different users or client devices).

A database "server" can also reside on a person's computer (e.g., laptop or desktop computer), in which case the amount of memory may be much more limited than a large dedicated server. In this case, using operators optimized for in-memory execution, the database "server" may run out of memory even when the query accesses moderate sized tables and has moderate complexity. Again, the outcome is either complete failure (no results) or poor performance based on swapping memory to disk.

SUMMARY

Accordingly, implementations of the present invention are directed to database server query processing that includes dynamic selection of query execution operators. When a query is compiled, the compiler generates an execution plan that can use either operators that are optimized to work in volatile memory (in-memory operators) or operators that are optimized to work efficiently when there will be swapping to disk (spooling operators). The former set of operators assume there is unlimited memory, whereas the latter set of operators perform within a fixed memory budget. In general, the best performance is achieved with the in-memory operators, but disclosed implementations provide for dynamically recompiling a query when an in-memory operator runs out of memory. This enables more efficient query processing regardless of how much memory is available.

In accordance with some implementations, a method for dynamically selecting query execution operators is performed at a computing device having one or more processors, volatile memory, and non-volatile memory. The one or more programs execute to retrieve data from a database (e.g., a SQL database). The process receives a query (e.g., an SQL expression), parses the query to form a query execution tree, and compiles the execution tree to form a first executable plan. The first executable plan includes a plurality of in-memory operators that execute within the volatile memory without swapping to the non-volatile memory. The in-memory operators are typically optimized based on the assumption that there is unlimited volatile memory. The process then executes the first executable plan. While executing a first in-memory operator in the first executable plan, the process detects insufficient memory to complete execution of the first in-memory operator. In response to detecting insufficient memory, the process aborts execution of the first executable plan and recompiles the query execution tree to form a second executable plan. The second executable plan includes a plurality of spooling operators instead of the in-memory operators. Each of the spooling operators executes within a respective fixed volatile memory budget and is configured to swap to non-volatile memory according to the respective fixed volatile memory budget. In some implementations, all of the in-memory operators from the first executable plan are replaced by spooling operators in the second executable plan. In some implementations, less than all of the in-memory operators in the first executable plan are replaced by spooling operators in the second executable plan. At least the first in-memory operator is replaced by a spooling operator in the second executable plan. The process executes the second executable plan, including the plurality of spooling operators, to identify a set of results from the database that is responsive to the query, and returns the set of results.

In some implementations, recompiling the query execution tree includes replacing the first in-memory operator with a first spooling operator in the second executable plan, and the second executable plan includes one or more in-memory operators.

In some implementations, aborting execution of the first executable plan includes identifying a first portion of the query execution tree that has completed execution before the detection of insufficient memory, and storing intermediate results corresponding to the first portion. In this case, the process recompiles all of the query execution tree except for the first portion, and execution of the second executable plan reuses the stored intermediate results.

In some implementations, the data storage for the first executable plan is in a first format different from a second data storage format used by the second executable plan, and storing the intermediate results comprises transforming data from the first format to the second format.

In some instances, the first in-memory operator is a hash join that builds a hash table within the volatile memory. The first in-memory operator is replaced by a first spooling operator in the second executable plan. The first spooling operator utilizes a partitioned hash table that swaps partitions between volatile memory and non-volatile memory.

In some instances, the first executable plan includes a spooling operator, which is distinct from the first in-memory operator and is configured to execute within a second fixed volatile memory budget. In some implementations, compiling the query execution tree to form the first executable plan includes identifying two or more tables from the database that are to be joined according to the query execution tree. The process estimates hash table size according to database statistics for the two or more tables and determines whether the estimated hash table size exceeds a predefined threshold value. When the estimated hash table size exceeds the predefined threshold value, the process assigns the spooling operator to perform the join as part of the first executable plan.

In some implementations, a computing device includes one or more processors, memory, and one or more programs stored in the memory. The programs are configured for execution by the one or more processors. The one or more programs include instructions for performing any of the methods described herein.

In some implementations, a non-transitory computer readable storage medium stores one or more programs configured for execution by a computing device having one or more processors, volatile memory, and non-volatile memory. The one or more programs include instructions for performing any of the methods described herein.

Thus methods and systems are disclosed that execute queries using very efficient in-memory operators. The process dynamically detects when there is insufficient memory for the in-memory operators, and switches to alternative operators that are optimized to operate under fixed memory budgets.

It is to be understood that both the foregoing general description and the following detailed description are exemplary and explanatory and are intended to provide further explanation of the invention as claimed.

BRIEF DESCRIPTION OF THE DRAWINGS

For a better understanding of the aforementioned systems and methods that provide efficient database query processing, reference should be made to the Description of Implementations below, in conjunction with the following drawings in which like reference numerals refer to corresponding parts throughout the figures.

FIGS. 9A-9C provide a flowchart of a process for dynamic selection of query execution operators according to some implementations.

Reference will now be made to implementations, examples of which are illustrated in the accompanying drawings. In the following description, numerous specific details are set forth in order to provide a thorough understanding of the present invention. However, it will be apparent to one of ordinary skill in the art that the present invention may be practiced without requiring these specific details.

DESCRIPTION OF IMPLEMENTATIONS

Figure 1:
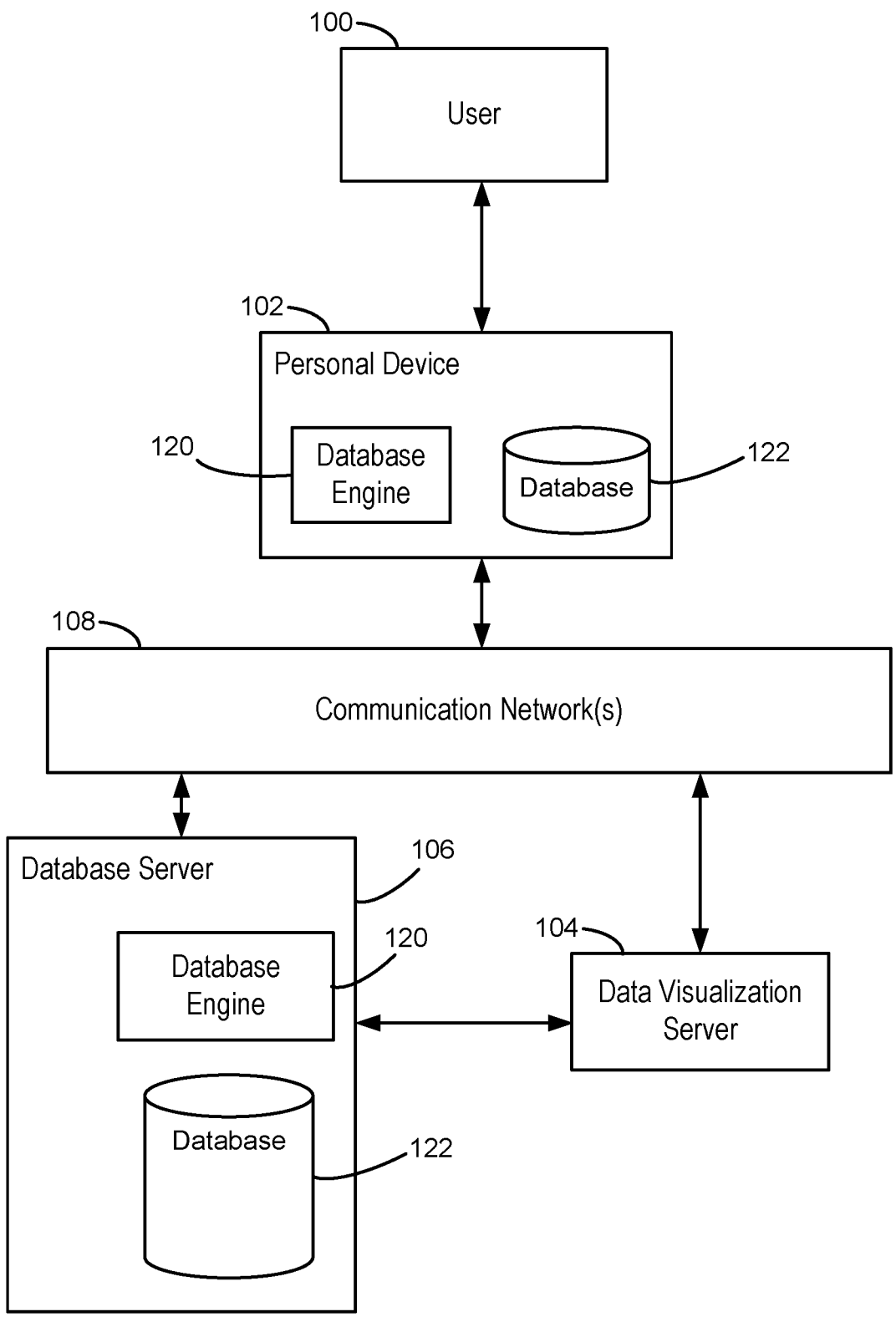
FIG. 1 illustrates the context for a database system in accordance with some implementations.

FIG. 1 illustrates a context in which some implementations operate. A user 100 interacts with a personal device 102, such as a desktop computer, a laptop computer, a tablet computer, or a mobile computing device. A personal device 102 is an example of a computing device 200. The term "computing device" also includes server computers, which may be significantly more powerful than a personal device used by a single user, and are generally accessed by a user only indirectly. An example computing device 200 is described below with respect to FIG. 2, including various software programs or modules that execute on the device 200. In some implementations, the personal device 102 includes one or more desktop data sources 224 (e.g., CSV files or spreadsheet files). In some implementations, the personal device 102 includes a database engine 120, which provides access to one or more relational databases 122 (e.g., SQL databases). In some implementations, the personal device includes a data visualization application 222, which the user 100 uses to create data visualizations from the desktop data sources 224 and/or the relational databases 122. In this way, some implementations enable a user to visualize data that is stored locally on the personal device 102.

In some cases, the personal device 102 connects over one or more communications networks 108 to one or more external database servers 106 and/or a data visualization server 104. The communication networks 108 may include local area networks and/or wide area networks, such as the Internet. In some implementations, the data visualization server 104 provides a data visualization web application that runs within a web browser 220 on the personal device 102. In some implementations, data visualization functionality is provided by both a local application 222 and certain functions provided by the data visualization server 104. For example, the data visualization server 104 may be used for resource intensive operations. In some implementations, the one or more database servers 106 include a database engine 120, which provides access to one or more databases 122 that are stored at the database server 106. As illustrated in FIG. 1, a database engine 120 and corresponding databases 122 may reside on either a local personal device 102 or on a database server 106. In some implementations (not illustrated here), the data visualization server 104 includes a database engine 120 and one or more databases 122.

Figure 2:
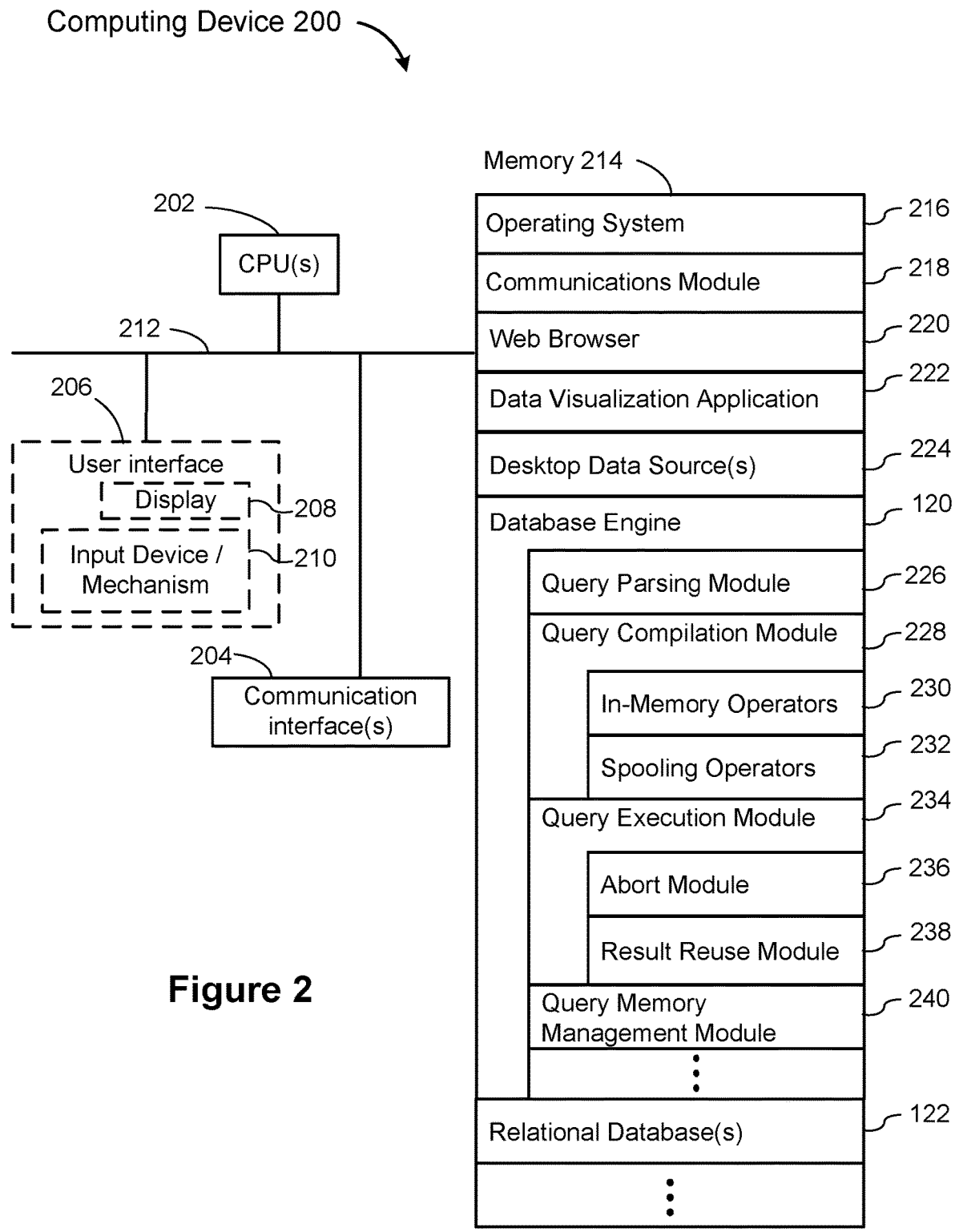
FIG. 2 is a block diagram of a computing device according to some implementations.

FIG. 2 is a block diagram illustrating a computing device 200 in accordance with some implementations. As used herein, the term "computing device" includes both personal devices 102 and servers, such as a database server 106 or a data visualization server 104. A computing device 200 typically includes one or more processing units/cores (CPUs) 202 for executing modules, programs, and/or instructions stored in the memory 214 and thereby performing processing operations; one or more network or other communications interfaces 204; memory 214; and one or more communication buses 212 for interconnecting these components. The communication buses 212 may include circuitry that interconnects and controls communications between system components. A computing device 200 may include a user interface 206 comprising a display device 208 and one or more input devices or mechanisms 210. In some implementations, the input device/mechanism 210 includes a keyboard; in some implementations, the input device/mechanism includes a "soft" keyboard, which is displayed as needed on the display device 208, enabling a user to "press keys" that appear on the display 208. In some implementations, the display 208 and input device/mechanism 210 comprise a touch screen display (also called a touch sensitive display). In some implementations, the memory 214 includes high-speed random access memory, such as DRAM, SRAM, DDR RAM, or other random access solid state memory devices. In some implementations, the memory 214 includes non-volatile memory, such as one or more magnetic disk storage devices, optical disk storage devices, flash memory devices, or other non-volatile solid state storage devices. In some implementations, the memory 214 includes one or more storage devices remotely located from the CPU(s) 202. The memory 214, or alternatively the non-volatile memory device(s) within the memory 214, comprises a computer readable storage medium. In some implementations, the memory 214, or the computer readable storage medium of the memory 214, stores the following programs, modules, and data structures, or a subset thereof:

- an operating system 216, which includes procedures for handling various basic system services and for performing hardware dependent tasks;
- a communications module 218, which is used for connecting the computing device 200 to other computers and devices via the one or more communication network interfaces 204 (wired or wireless) and one or more communication networks 108, such as the Internet, other wide area networks, local area networks, metropolitan area networks, and so on;
- a web browser 220 (or other client application), which enables a user 100 to communicate over a network with remote computers or devices. In some implementations, the web browser 220 executes a data visualization web application (not shown) downloaded from a data visualization server 104. In some implementations, a data visualization web application (not shown) is an alternative to storing a data visualization application 222 locally;
- a data visualization application 222, which enables users to construct data visualizations from various data sources. The data visualization application 222 retrieves data from one or more data sources, such as a desktop data source 224 (e.g., a CSV file or flat file), a relational database 122 stored locally, or a desktop data source or relational database 122 stored on another device (such as a database server 106). The data visualization application then generates and displays the retrieved information in one or more data visualizations;
- one or more desktop data sources 224, which have data that may be used and displayed by the data visualization application 222. Data sources 224 can be formatted in many different ways, such as spreadsheets, XML files, flat files, CSV files, text files, JSON files, or desktop database files. Typically, the desktop data sources 224 are used by other applications as well (e.g., a spreadsheet application);
- a database engine 120, which receives database queries (e.g., from a data visualization application) and returns corresponding data. The database engine 120 typically includes a plurality of executable modules;
- the database engine 120 includes a query parsing module 226, which parses received queries (e.g., SQL database queries) to create an operator tree, which is sometimes referred to as an expression tree or execution tree. In some implementations, the query parsing module 226 is contained within the query compilation module 228;
- the database engine 120 includes a query compilation module 228, which translates the operator tree into executable code. For brevity, the query compilation module 228 is also referred to as the compiler. In some implementations, the compiler 228 optimizes executable code. In some implementations, the query compilation module 228 includes in-memory operators 230 and spooling operators 232, and the compiler 228 selects which operators to use based on available memory. The determination of available memory may be performed prior to execution or during execution (e.g., by running out of memory);
- the database engine 120 includes a query execution module 234, which executes the code generated by the query compilation module 228. In some implementations, the query execution module 234 includes an abort module 236, which can abort the execution of the code (e.g., upon detecting an out of memory condition). In some implementations, the abort module communicates with the query compilation module 228 to recompile the operator tree. In some implementations, the query execution module 234 includes a result reuse module 238, which stores and reuses intermediate results created while executing code from a prior compilation; and
- the database engine 120 includes a query memory management module 240, which detects when there is insufficient memory while executing the compiled code. In some implementations, the query memory management module 240 communicates with a query execution module 234 and/or the abort module 236 to abort execution of the compiled code.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise rearranged in various implementations. In some implementations, the memory 214 stores a subset of the modules and data structures identified above. Furthermore, in some implementations, the memory 214 stores additional modules or data structures not described above.

Although FIG. 2 shows a computing device 200, FIG. 2 is intended more as a functional description of the various features that may be present rather than as a structural schematic of the implementations described herein. In practice, and as recognized by those of ordinary skill in the art, items shown separately could be combined and some items could be separated.

The query memory management module 240 tracks the allocated memory for each operator. In some implementations, when the memory usage exceeds the maximum allowed memory, the memory management module 240 throws an error. When such an error is detected, the query execution is aborted and restarted with execution code that replaces at least some of the in-memory operators with spooling operators.

As described below in FIG. 4, a query is parsed to form an operator tree 404. Each operator is then compiled to native code (e.g., llvm) using operator translators. The resulting llvm code is then executed. Some implementations include a global force_spooling setting, which specifies whether to use in-memory or spooling operator translators. For example, in some implementations the default value for the force_spooling parameter is False, but is set to True if the initial execution runs out of memory and the operator tree has to be recompiled.

There are two sets of operator translators: spooling and in-memory. The in-memory operators assume that their allocated memory will always stay in volatile memory and thus are optimized for this scenario. On the other hand, each spooling operator has a fixed memory budget in which it can operate. In some implementations, the default value for the fixed memory budget is 16 MB. In some implementations, there is a single global parameter that specifies the fixed memory budget for all of the operators. In other implementations, the fixed memory budget can be specified on a more granular level (e.g., by operator type). In some implementations, the fixed memory budget can be determined dynamically during compilation (e.g., based on an estimated size of memory needed by the operator based on the specific data accessed).

Because the spooling operators must operate within a fixed volatile memory bound, they implement different algorithms that are better suited when spooling to disk is required. For some operators, the compiler 228 uses a mix of spooling versions and in-memory versions. For many operators there is both a spooling implementation and an in-memory implementation. These include: group by, group join, join, sort, union, union all, temp, and early probe. In some implementations, this set of operators also includes: cursor scan, cursor create, iteration, k-means, naive Bayes, intersect, intersect all, except, and except all. Some operators have only a single implementation because they do not build temporary results. This includes: assert single, binary scan, csv scan, debug print, external format export, map, project, rcf file scan, select, table function, table construction, table scan, insert, delete, and update.

For sorting, the algorithm used depends on whether the operator will be executed entirely within volatile memory, and the degree of parallelism. In some implementations, a serial in-memory sort uses a standard sort (std::sort). In some implementations, a parallel in-memory sort uses a parallel merge sort implementation. In some implementations, a sort implemented by a spooling operator uses an external weak heap sort. This algorithm builds a weak heap while reading the input data. When the memory limit is reached, the heap is flushed to non-volatile memory and a new heap is started in the volatile memory. After all of the input is read, the heaps are merged together to form the sorted result. Weak heaps reduces the number of needed comparisons.

To implement the "group by" functionality of SQL, implementations typically use a hash table. The hash group operator can do this in memory using one big hash table. The corresponding spooling operator generates one spooled hash table. Whenever the spooled hash table runs out of memory, the hash table is partitioned and the partitions are spooled to disk. After all of the input is consumed, the partitions are merged. This is similar to the mechanism used for a grace hash join. The aggregate functions are the same whether using an in-memory or spooled join operator. In some circumstances, the results may differ due to numeric stability issues because there may be different execution orders. This can also occur for the in-memory group by operator with parallel execution.

A hash group join is similar to a group by. Because the join columns are the key of one relation, some implementations simply have one hash table that is built by the left input. The right input is then merged into the hash table. The whole input is merged into the hash table in order to compute the aggregation function(s). In some implementations, the in-memory operator for hash group join uses the same in-memory hash table as the group by operator. Similarly, in some implementations, the spooling operator for hash group join uses the same spooled hash table as the group by operator.

A hash join can be performed in memory by generating one big, in-memory hash table from the left side and then probing it from the right side. For spooling, a hash join has two alternatives, depending how big the left side is. If the left side is small enough, the entire hash table is kept in memory. If it is too large, the hash table is spooled to disk in partitions. Some implementations also spool the right side to disk in a partitioned hash table. In some implementations, the left input size is determined at compile time using database statistics. Alternatively, the left input size is determined while executing. Some implementations perform an in-memory hash-join or a grace hash join depending on the size. In the grace hash join, matching partitions are used.

To perform a Union or Union All, some implementations use the same hash table as in the Group By to sort out the duplicates. For the spooling operator, all received tuples are saved into a spooled hash table, similar to the Group By operator. When merging the entries or partitions, implementations check if the tuple already exists to determine whether to add it or drop it.

Some implementations include a buffer manager. The buffer manager uses memory mapping to fix pages. In some implementations, the buffer manager does not use locking, so it cannot be called from a multi-threading context. In some implementations, there is only one buffer manager managed by the global infrastructure.

Figure 3:
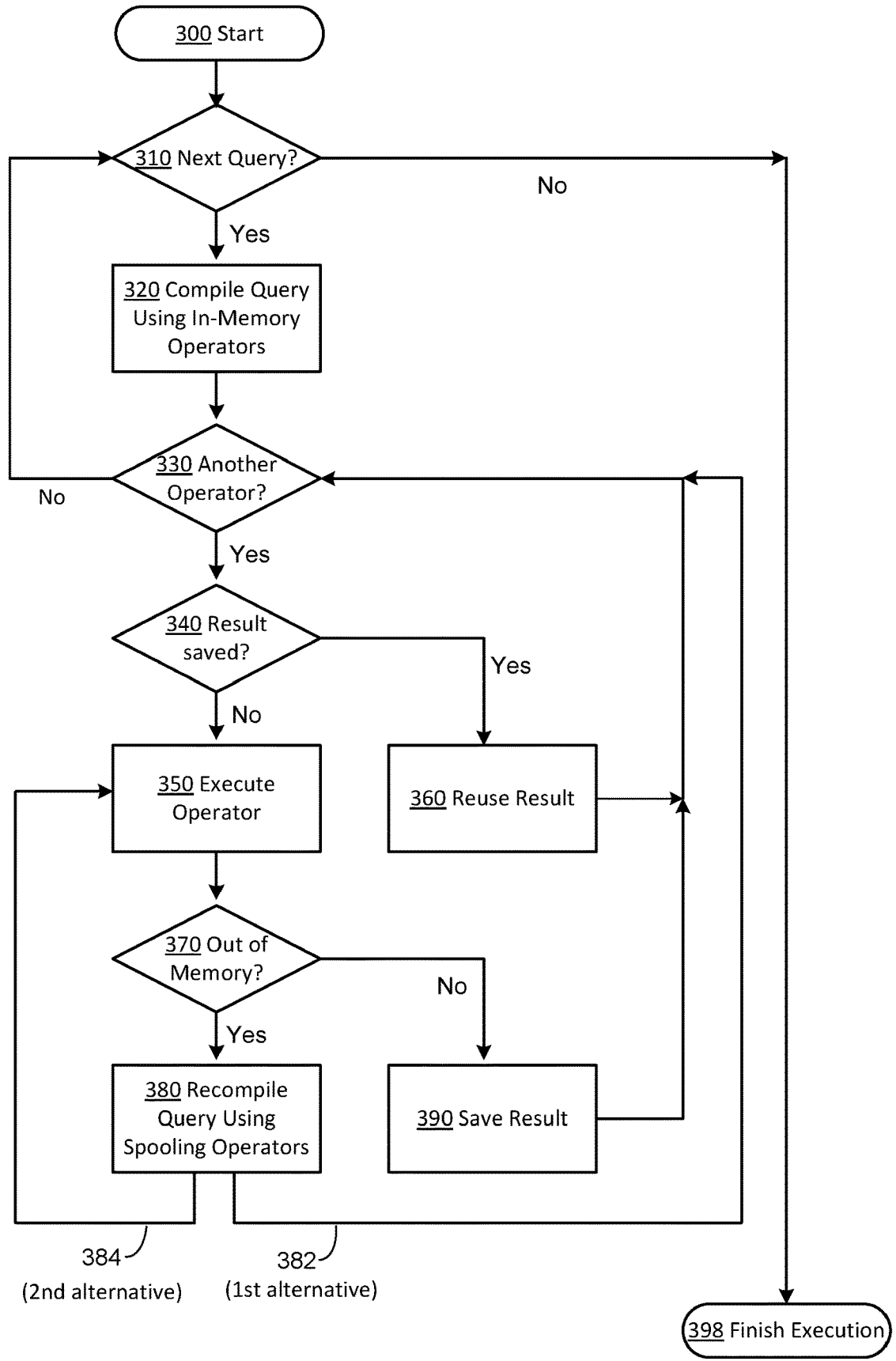
FIG. 3 is a flowchart of a process for query processing and execution according to some implementations.

FIG. 3 is a flowchart of a process for query processing and execution according to some implementations. A database engine 120 receives a set of one or more queries to process. In some implementations, the database engine 120 processes the queries in parallel, running more than one instance of the flowchart in FIG. 3. After identifying (310) the next query, the compiler 228 compiles (320) the query, creating an execution plan that has in-memory operators. Once the query has been compiled, the query execution module executes the execution plan. In some cases, the execution plan is linear, so the steps in the execution plan are executed serially. In this case, only one operator at a time is executed. In other cases, the execution plan has two or more paths that can run (at least partially) in parallel. In this case, two or more of the operators may execute simultaneously.

The query execution module 234 iterates (330) through the operators according to the execution plan finding the next operator to execute. In some implementations, if results from a prior execution of the operator have been saved (340), the reuse module 238 reuses (360) those results; otherwise, the query execution module 234 executes (350) the operator. The database engine 120 monitors the execution of the operator to determine (370) if it has run out of memory. If the execution of the operator does not cause the system to run out of memory, the database engine 120 saves (390) the result of executing the operator before proceeding to the next operator (330). On the other hand, if the execution of the operator causes the system to run out of memory (370), the compiler 228 recompiles (380) the query, creating a new execution plan that uses spooling operators.

As shown by the first alternative 382 and the second alternative 384 in FIG. 3, there are multiple implementation options for how to proceed when an in-memory operator runs out of memory. In a first alternative 382, the entire execution plan is recompiled, and any intermediate results that have already been computed are discarded. Query execution restarts (330) by finding a first operator in the new execution plan. In a second alternative 384, just the specific operator that ran out of memory is recompiled, and then re-executed (350). Typically, in-memory operators and spooling operators use and create different internal data structures, so switching from an in-memory operator to a spooling operator requires recompilation of a larger portion (but not all) of the first execution plan. In this third alternative (not shown), intermediate results from executing the first execution plan are transformed into the format required for the spooling operators. In this way, the recompiled portion of the execution plan is able to reuse the work that has already occurred.

The database engine 120 finishes execution (398) once all of the operators for all of the queries are processed (310).

Figure 4:
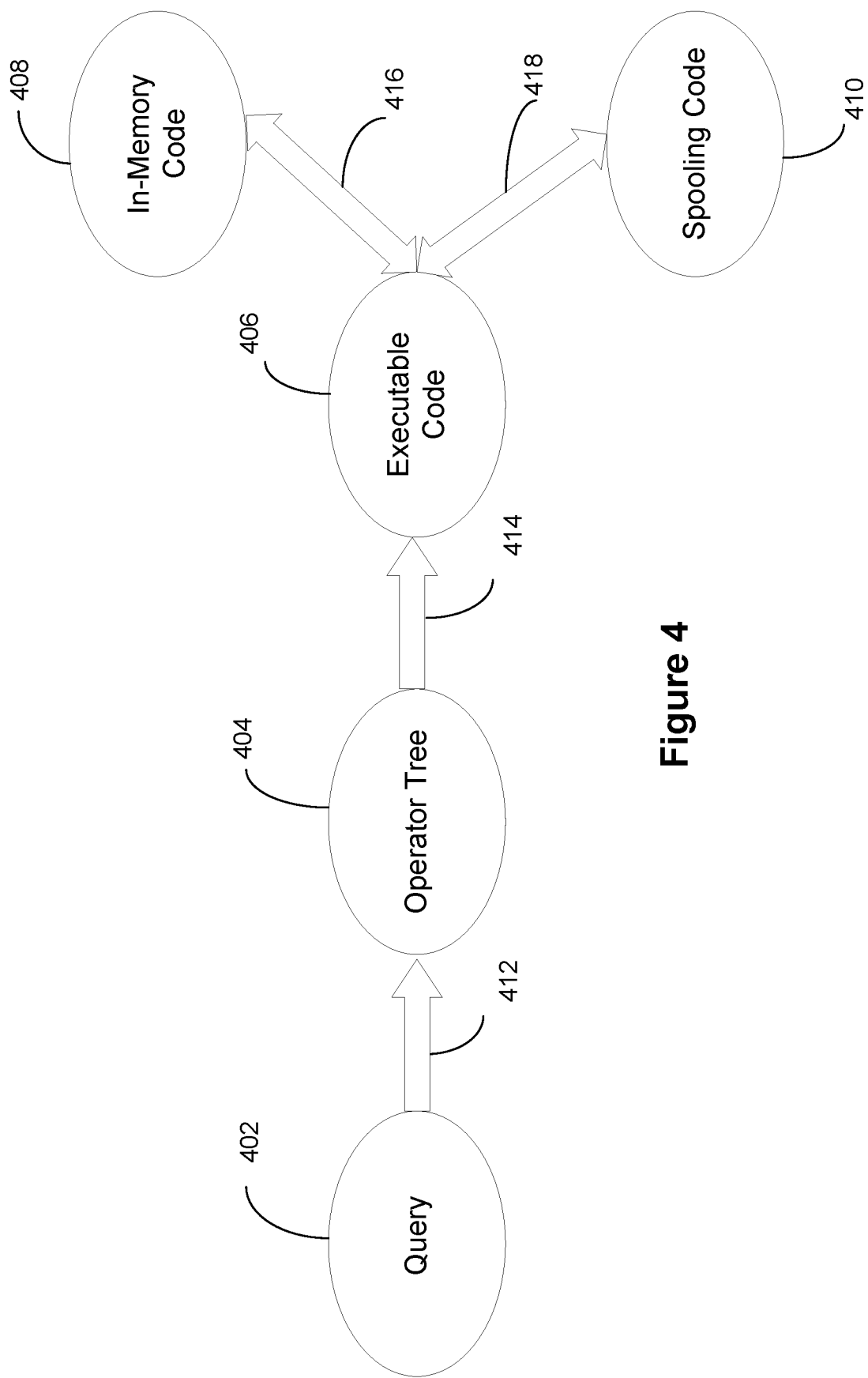
FIG. 4 illustrates generally a process that transforms a query into executable code according to some implementations.

FIG. 4 illustrates generally the processing of a query. The query parsing module 226 parses (412) a given query 402 to form an operator tree 404. In some implementations, the operator tree 404 is compiled (414) by the query compilation module 228 (e.g., LLVM) to create executable code 406 (e.g., native machine code). This executable code is also called an execution plan. In some implementations, the executable code 406 executes (416) in-memory implementations 408 of the operators in the operator tree 404. In some implementations, the executable code 406 itself includes the in-memory code 408. In some implementations, the executable code executes (418) spooling code 410 corresponding to spooling implementations of the operators in the operator tree 404. In some implementations, the in-memory code 408 and/or the spooling code 410 include instructions to return or branch back to the executable code 406. In some implementations, the executable code 406 runs in parallel with the in-memory code 408 and/or the spooling code 410, such as on a different thread or on a different process on the computing device 200. In some implementations, a query memory management module 240 manages execution of the executable code 406 and detects when the in-memory code 408 has insufficient memory to execute. In some implementations, the executable code 406, in response to detecting that the in-memory code has insufficient memory, aborts the execution of the in-memory code 408, using an abort module 236. In some implementations, in response to detecting that the in-memory code has insufficient memory, the compiler 228 recompiles the operator tree 404 to generate new executable code that calls (418) the spooling code 410. In some implementations, the process of recompilation includes substituting spooling operators 232 for in-memory operators 230. In some cases, all of the in-memory operators are replaced by corresponding spooling operators; in other cases, only a subset of the in-memory operators are replaced (e.g., just the in-memory operator that ran out of memory during execution or a subtree of the operator tree).

Figure 5:
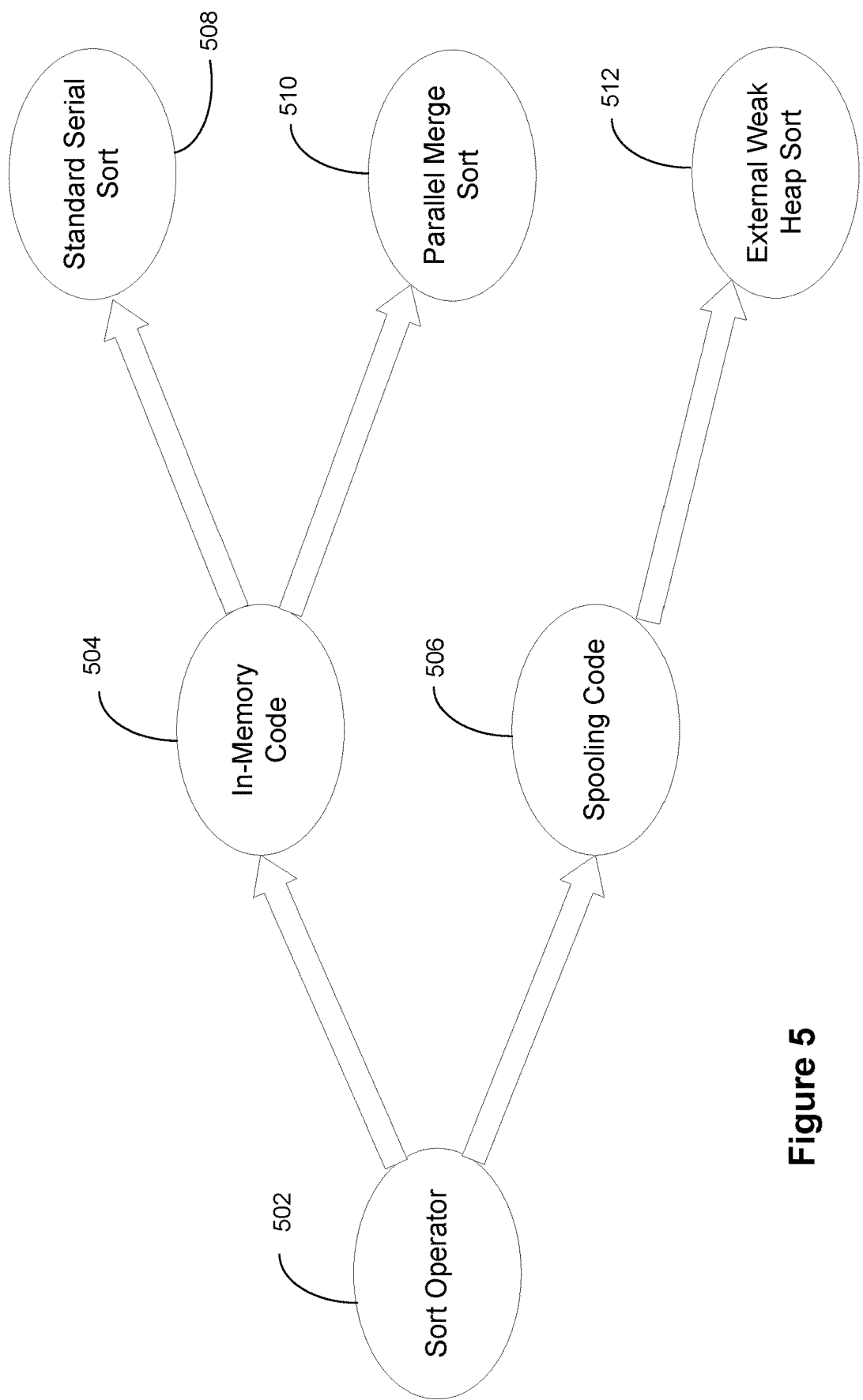
FIGS. 5, 6, 7, 8A and 8B provide examples of how various query operators are implemented using in-memory operators and spooling operators, in accordance with some implementations.

FIGS. 5, 6, 7, 8A and 8B show examples of in-memory and spooling code, corresponding to in-memory operators 230 and spooling operators 232, for different query operators. As FIG. 5 illustrates, in some implementations, a sort operator 502 uses either in-memory code 504 comprising a standard serial sort 508 or a parallel merge sort 510, or spooling code 506 comprising an external weak heap sort 512. In some implementations, a sort operator is processed by building a weak heap while reading the input data. In some implementations, if the execution of the sort operator overflows memory, the heap is flushed and a new heap is created and used. In some implementations, after all the input is read, the heaps are merged together to form the result of the sort query. Some implementations use weak heaps that require a fewer number of comparisons compared to normal heaps.

Figure 6:
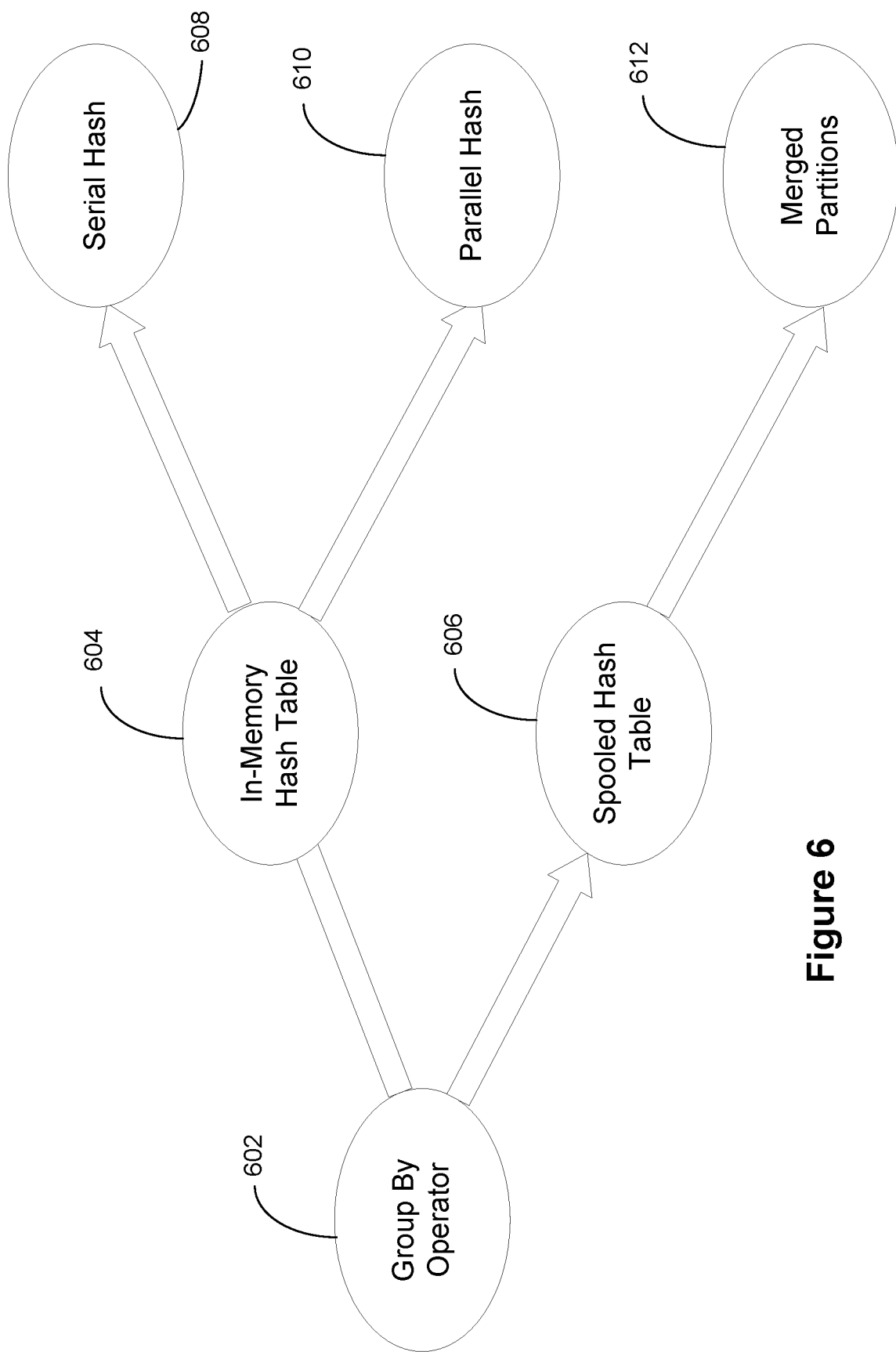

As illustrated in FIG. 6, in some implementations, a Group By operator 602 uses either an in-memory hash table 604 or a spooling hash table 606. An in-memory hash table 604 can use either a serial hash 608 or a parallel hash 610. In some implementations, whenever the spooling hash table 606 runs out of memory, the hash table is partitioned into a plurality of hash table partitions. After all of the input is consumed, the hash table partitions are merged to form the merged partitions 612, similar to a parallel hash 610. Some implementations use an enhanced threshold to tolerate numeric stability issues due to the different execution order that arises with merging.

Figure 7:
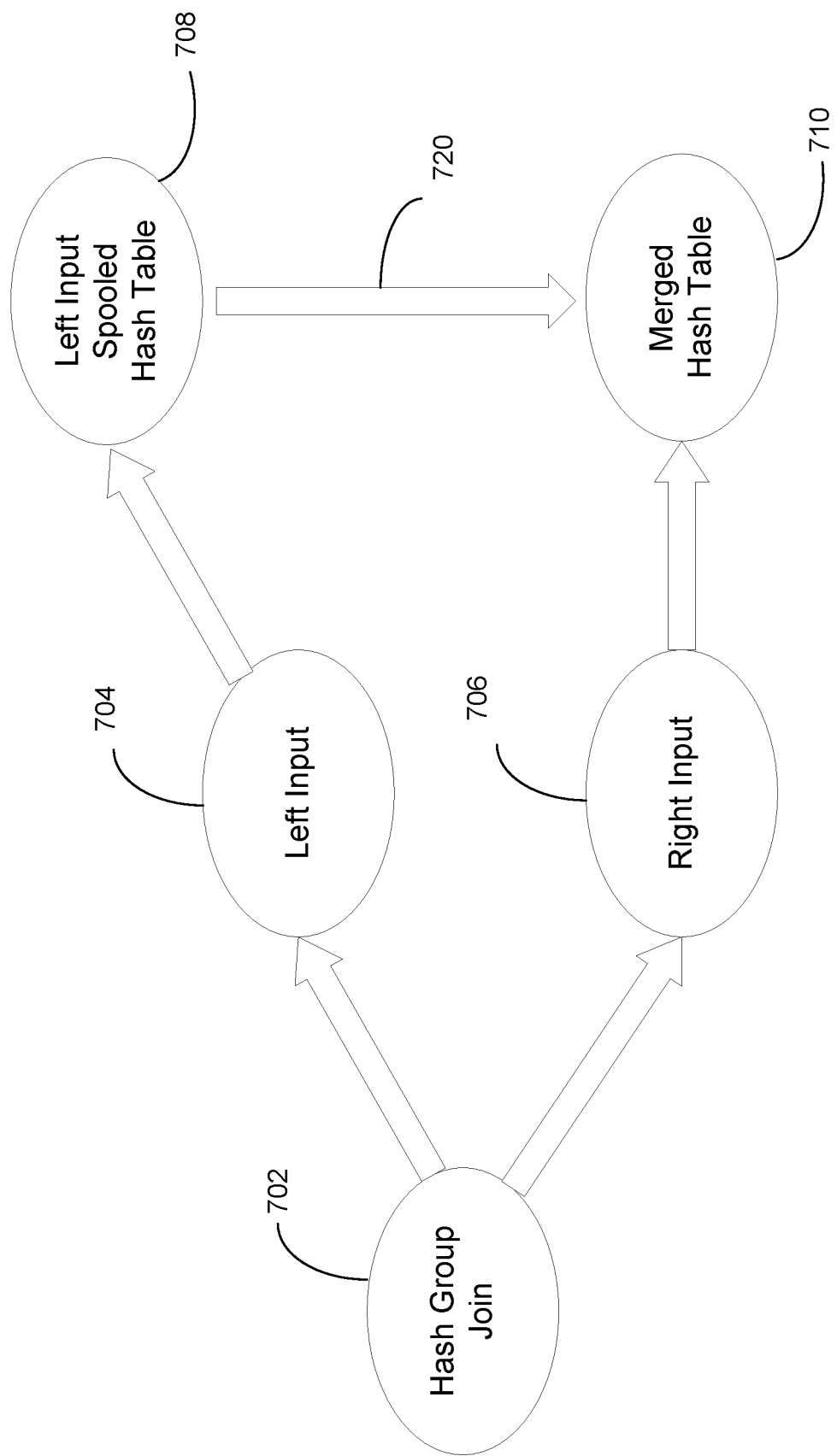
Figure 8A:
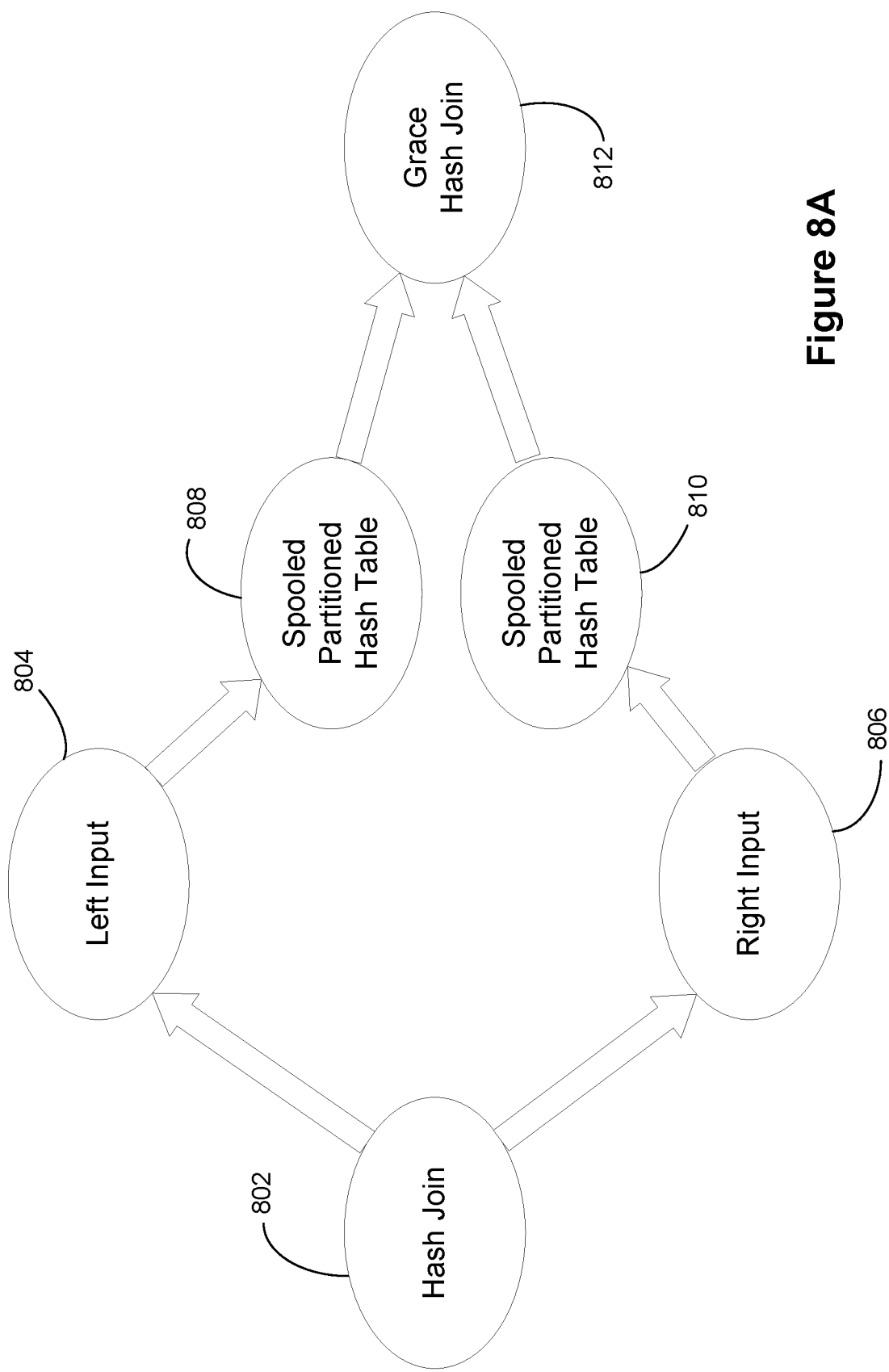
Figure 8B:
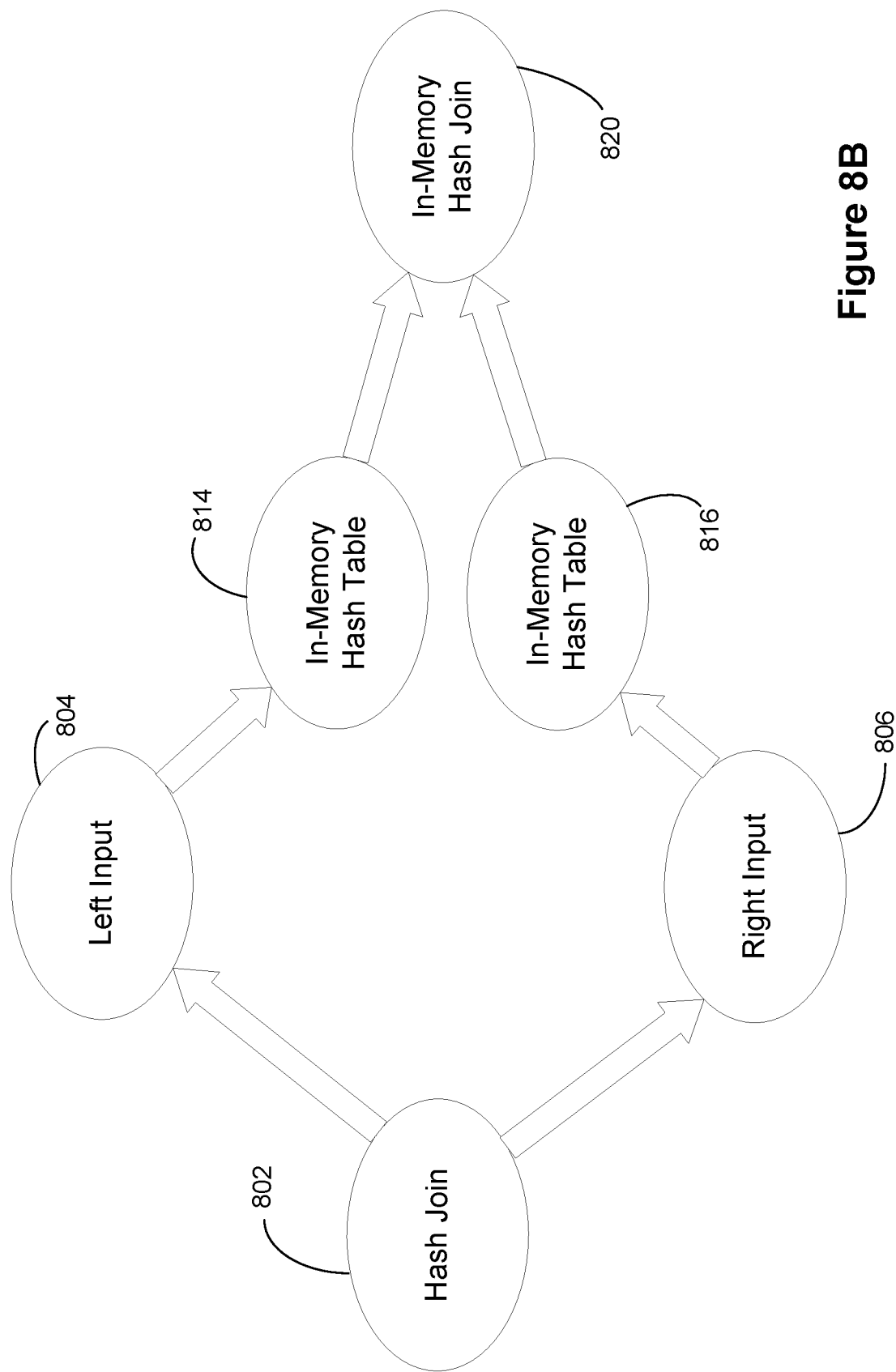

As shown in FIG. 7, in some spooling implementations, a hash group join operator 702 is handled by dividing data into a left input 704 and a right input 706. The left input spooled hash table 708 is then merged with the right input 706 to form a merged hash table 710. FIG. 8A illustrates a spooling implementation for a hash join operator 802, and FIG. 8B illustrates an alternative in-memory implementation for the hash join operator 802. Some implementations begin with one large in-memory hash table from the left-side input 804 and then probe it with the right-side input 806. In some implementations, when the left-side input 804 is large, the hash table is spooled to disk in partitions 808. The right-side input 806 is similarly spooled to disk into a partitioned hash table 810. These are compared to form the grace hash join 812. For the in-memory case illustrated in FIG. 8B, the in-memory hash tables 814 and 816 are used, without spooling to disk. The comparisons of these hash tables build the in-memory hash join 820. Whether the hash tables can be accommodated in memory depends on the size of the left-side input 804. In some cases, the size can be determined at compile time (e.g., using statistics about the tables in the join). In other cases, an in-memory version is used by default, and if it runs out of memory the execution plan is recompiled to replace the in-memory operator with the corresponding spooling operator.

For the set operations (union and union all), some implementations use a hash table similar to group by operator to sort out the duplicates. Some implementations initially store all received tuples into a spooled hash table, and when merging the entries or partitions, drop a given tuple if it already exists.

Figure 9A:
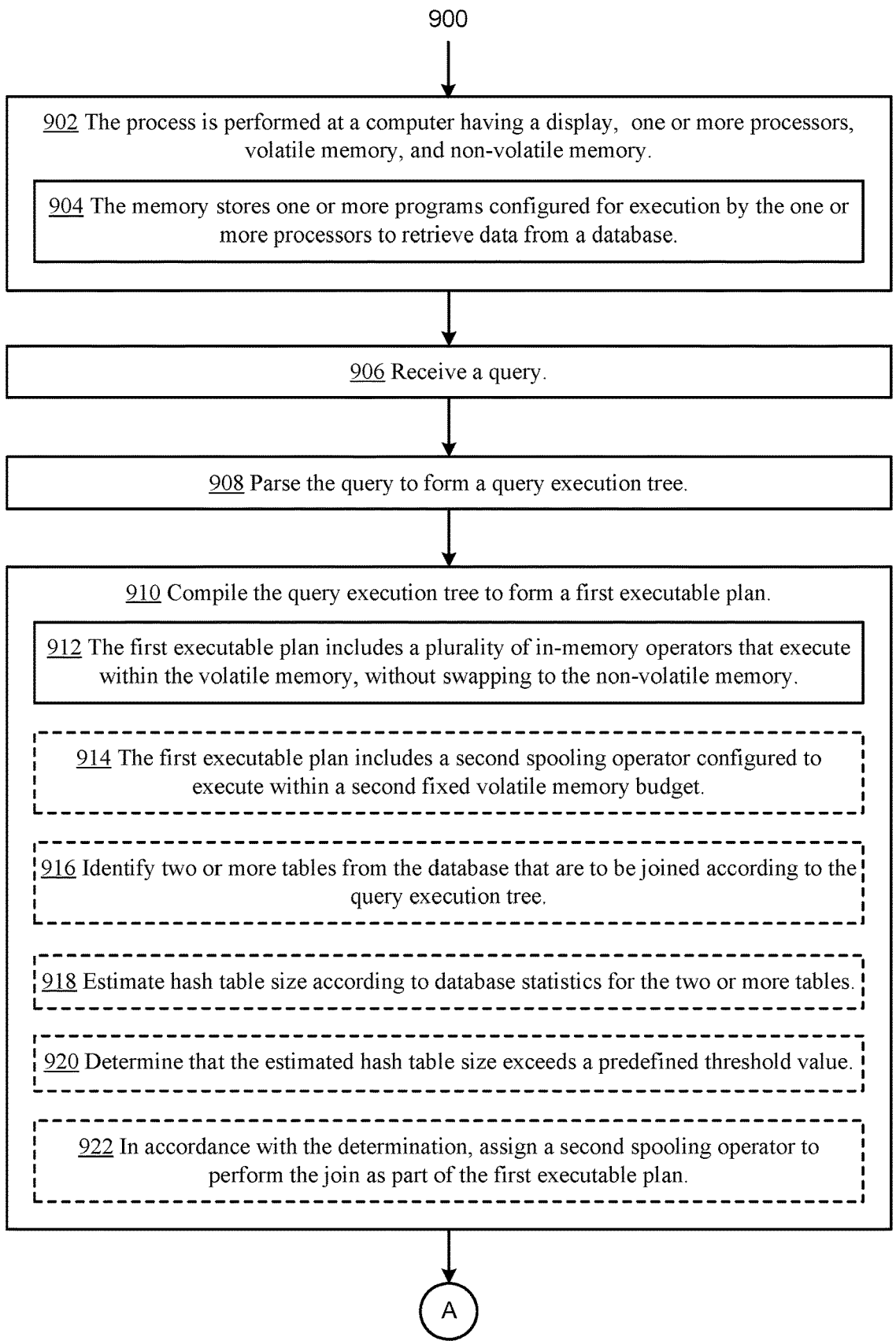
Figure 9B:
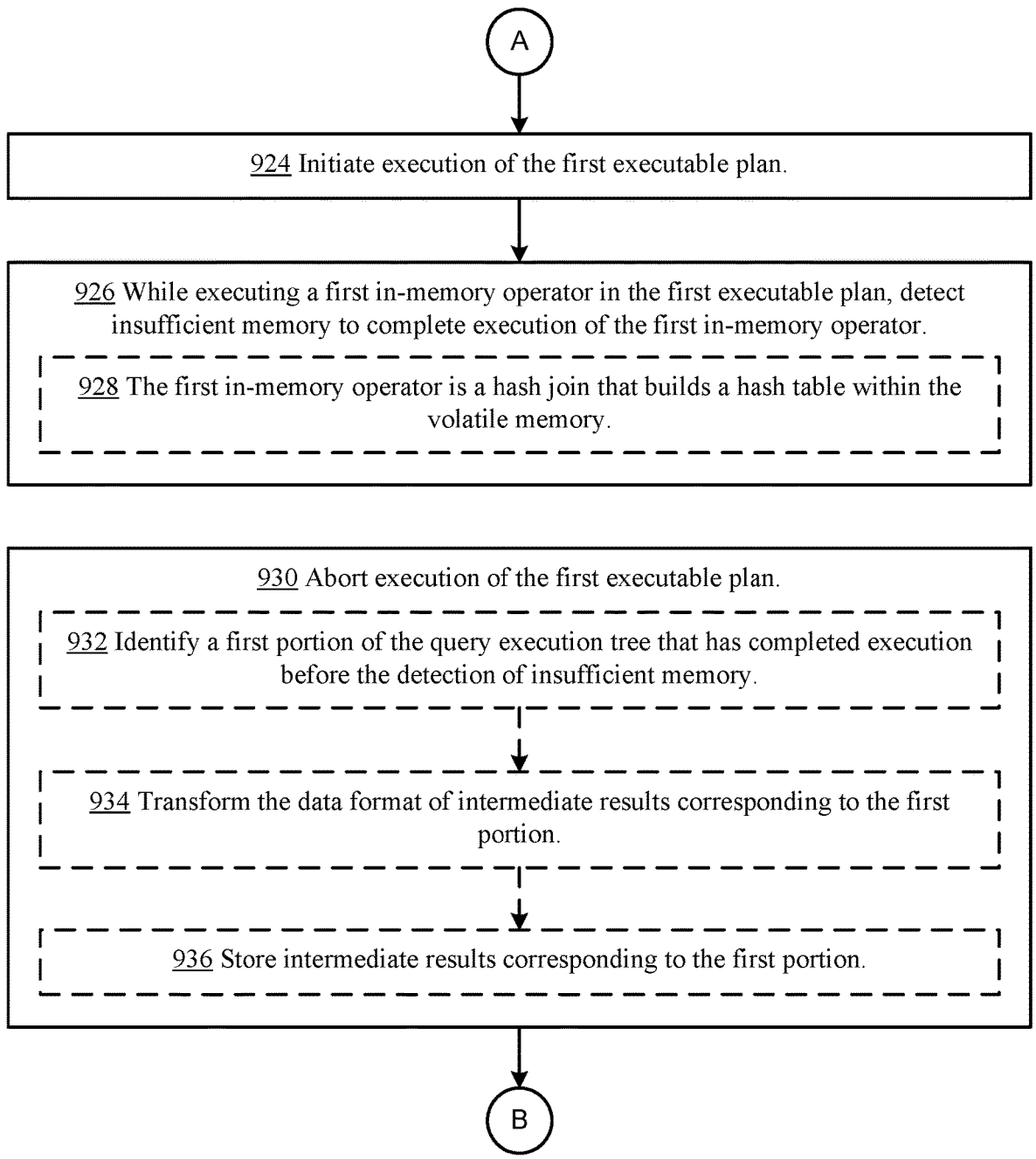

FIGS. 9A-9C provide a flowchart of a process 900 for dynamically selecting execution operator for efficient query processing. In some implementations, the method is performed (902) at a computer 200 having one or more processors 202, volatile and non-volatile memory 214. The memory 214 stores (904) one or more programs configured for execution by the one or more processors 202 to retrieve data from a database. The communications module 218 receives (906) a query. The query parsing module 226 parses (908) the query to form a query execution tree. After parsing the query, the query compilation module 228 compiles (910) the query execution tree to form a first executable plan. The first executable plan includes (912) a plurality of in-memory operators 230 that execute within the volatile memory without swapping to the non-volatile memory.

In some implementations, all of the operators in the first execution plan are in-memory operators. In some implementations, the first executable plan includes (914) one or more spooling operators that are configured to execute within a fixed volatile memory budget. In some implementations, selecting a spooling operator for the first execution plan includes the following steps: identifying (916) two or more tables from the database that are to be joined according to the query execution tree; estimating (918) hash table size according to database statistics for the two or more tables; determining (920) that the estimated hash table size exceeds a predefined threshold value; and, in accordance with that determination, assigning (922) a second spooling operator to perform the join as part of the first execution plan. This is one example where the memory requirement can be estimated in advance based on metadata about the tables that are being accessed by the query. By comparing the estimated memory requirement to the amount that is (or will be) available, the compiler can make an earlier decision about whether to use an in-memory operator or a spooling operator.

The query execution module 234 initiates (924) execution of the first executable plan. While executing a first in-memory operator in the first executable plan, the query memory management module 240 detects (926) insufficient memory to complete execution of the first in-memory operator. In some instances, the first in-memory operator is (928) a hash join. In response to detecting insufficient memory, the abort module 236 aborts (930) the execution of the first executable plan. In some implementations, aborting the execution includes identifying (932) a first portion of the query execution tree that has completed execution before the detection of insufficient memory. In this case, the abort module 236 stores (936) intermediate results corresponding to the first portion. In some implementations, before storing the intermediate results corresponding to the first portion, the abort module 236 transforms (934) the data format of intermediate results from a first format to a second format.

The query compilation module 228 recompiles (938) the query execution tree to form a second executable plan. In some implementations, the second executable plan includes (940) a plurality of spooling operators instead of in-memory operators. Each of the spooling operators executes (940) within a respective fixed volatile memory budget and is configured to swap to non-volatile memory according to the respective fixed volatile memory budget. In some implementations, recompiling the query execution tree includes replacing (942) the first in-memory operator with a first spooling operator in the second executable plan. In some instances, the first spooling operator utilizes (944) a partitioned hash table that swaps partitions between volatile memory and non-volatile memory. In some instances, the second executable plan includes (946) one or more in-memory operators (i.e., not all in-memory operators are replaced by spooling operators). In some implementations, recompiling the query execution tree includes recompiling (948) all of the query execution tree except the first portion (the portion previously identified as completed before running out of memory).

The query execution module 234 executes (950) the second executable plan to identify a set of results from the database that is responsive to the query. In some implementations, the result reuse module 238 reuses (952) stored intermediate results corresponding to the first portion (of the query execution tree), instead of executing the first portion again. The communications module 218 returns (954) the set of results corresponding to the query.

Figure 10:
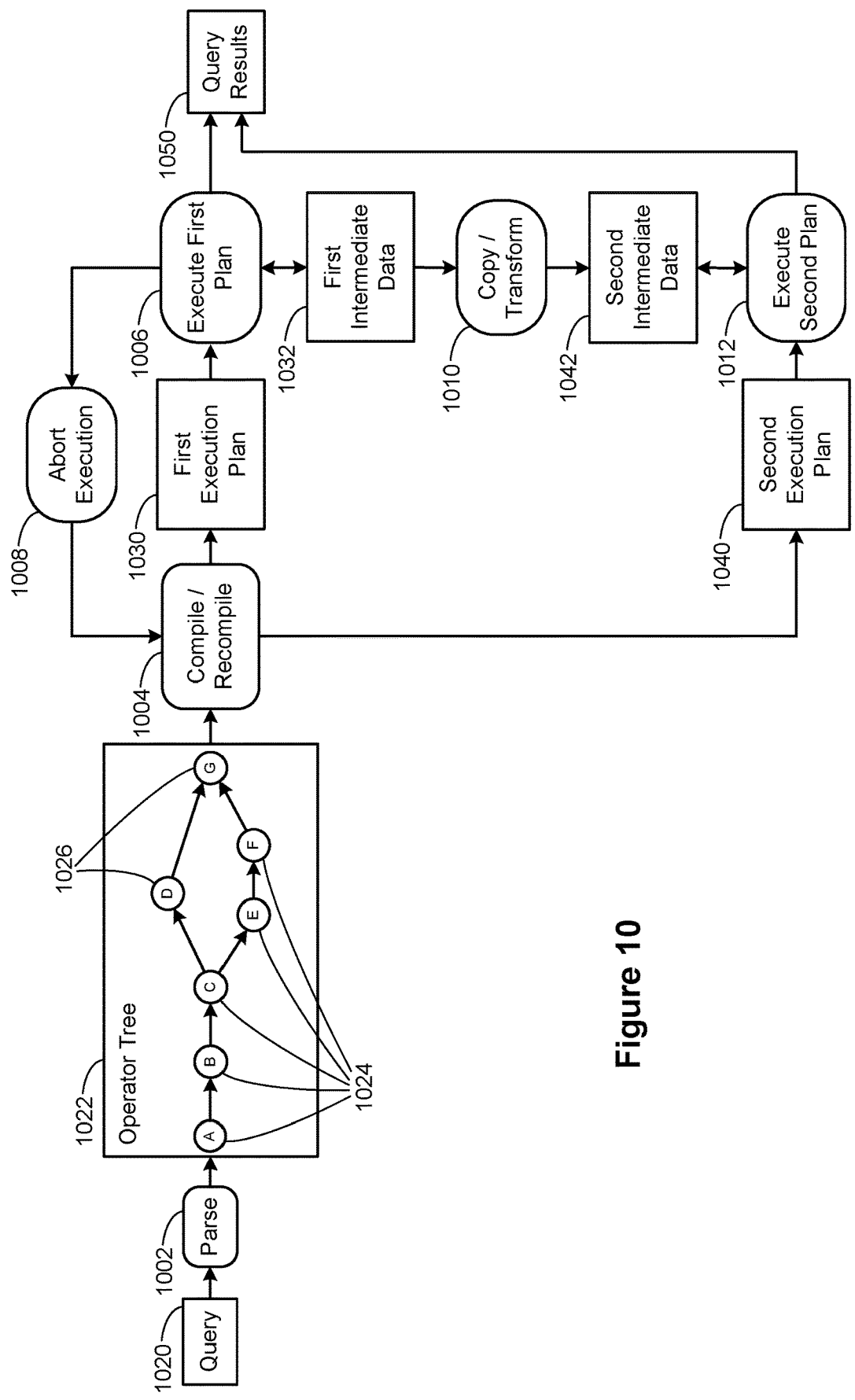
FIG. 10 is a process flow diagram illustrating a process of executing a query in accordance with some implementations.

FIG. 10 is a process flow diagram illustrating a process of executing a query in accordance with some implementations. The database engine 120 receives a query 1020. The query parsing module 226 parses (1002) the query to form an operator tree 1022 that captures the functional structure of the query. The operator tree includes a plurality of nodes, such as the nodes A-G (labelled as either 1024 or 1026, as explained below). In some cases, the operator tree is linear, such as the portion A, B, C in the operator tree 1022. In some cases, the operator tree includes branching, such as the branching after node C in the operator tree 1022. In some instances, the branches within an operator tree come back together, such as at node G in the operator tree 1022. When there is branching, some implementations process the branches in parallel. In some implementations, the nodes are processed serially, even when there is branching (e.g., by processing the nodes in the order A, B, C, D, E, F, G in the operator tree 1022).

The query compilation module 228 compiles (1004) the operator tree 1022 to form a first execution plan 1030 (e.g., LLVM code). Typically, the first execution plan 1030 includes just in-memory operators 230, but sometimes the first execution plan includes one or more spooling operators 232 as well (e.g., when it is determined at compile time that there will not be enough volatile memory).

The query execution module 234 then executes (1006) the first plan 1030. While executing the first plan, first intermediate data 1032 is saved (typically in volatile memory when possible). Steps within the first execution plan 1030 can access the intermediate results created by earlier steps in the plan. In some cases, while executing the first execution plan, memory runs out. Typically, this is detected by the query memory management module 240, which dynamically tracks memory usage. When the memory usage reaches a predefined limit, an error is raised. In some implementations, running out of memory is detected in other ways as well, such as a failure when attempting to dynamically allocate more memory.

When the executing first process 1006 runs out of memory, the abort module 236 aborts (1008) execution of the first execution plan. In some implementations, the abort module also identifies portions of the execution that have completed, and copies (1010) the intermediate results from the first intermediate data structures 1032 to a second intermediate data structure 1042 for use on a second try. In some implementations, the storage layout for the second intermediate data 1042 is different from the storage layout of the first intermediate data 1032, so copying the data includes transforming (1010) the intermediate data from the first format to the second format. For example, FIG. 6 above illustrates that an in-memory implementation for the Group By operator uses a single large hash table in memory, whereas a spooled implementation of the Group By operator uses merged partitions.

When a portion of the data is being reused, recompiling (1004) applies only to the nodes in the operator tree that were not completed in the first attempt. For example, in the operator tree 1022 in FIG. 10, the operators for nodes A, B, C, E, and F (labelled 1024) may have completed, so only the portion of the operator tree that includes the uncompleted nodes D and G (labelled 1026) has to be recompiled.

The compiler 228 recompiles 1004 the relevant portion of the operator tree to form the second execution plan 1040. As noted, the relevant portion may be the entire operator tree 1022 or just a portion that is less than the entire operator tree (e.g., just the nodes 1026).

The query execution module executes (1012) the second execution plan, which has spooling operators. At least one in-memory operator from the first execution plan has a corresponding spooling operator in the second execution plan. In general, by using the spooling operators with fixed memory budgets (e.g., 16 or 32 MB per operator), the query execution completes, thereby creating query results 1010, which are returned.

In most cases, the in-memory operators in the first execution plan do not run out of memory, so executing (1006) the first execution plan 1030 creates the query results 1050 directly, without a recompilation process.

Some implementations use a buffer manager (not shown) to manage memory consumed by query execution. In some implementations, the buffer manager uses memory mapping to fix buffers (e.g., pages). Some implementations of the buffer manager use locking and can be called from a multi-threading context. Some implementations use a plurality of buffer managers managed by a global memory management infrastructure. In some implementations, a buffer manager manages a session with multiple spooling queries allowing for parallel execution of the queries. In some implementations, the buffer manager is lazily created if needed. In some implementations, the buffer manager spools to a temporary file.

In some implementations, determining that an operator has run out of memory is based on reaching a global memory limit setting and determining that the query is not in the last pipeline of execution. In this case, the process aborts the query. In the last pipeline of execution, no operator allocates additional memory. (Only expressions in project or map can, e.g. regex replace.) In general, the memory allocated for the last pipeline expressions is negligible compared to memory allocated from operators (e.g., for hash tables).

In some implementations, when a query is aborted, all of the results retrieved so far are discarded, and the operator tree is recompiled using only spooling operators. the query execution then starts from scratch. In general, queries are not recompiled if they contain streaming, are not read only, throw any error other than out of memory, or throw an error in the last pipeline. In case memory is running out inside the last pipeline or the spooling plan runs out of memory, implementations typically return the out of memory error to the client and abort the query entirely.

Instead of starting from scratch, some implementations reuse at least some intermediate results that have already been computed. In these cases, at least one operator is in progress when the out of memory condition arises. In case the execution plan has two or more operations for the same query running in parallel, there may be two or more operations in progress. Typically, all of the operators in progress are aborted. The intermediate results from the completed operations are saved. The portion of the operator tree that has not completed is recompiled, and the execution resumes with the uncompleted portion. In some implementations, the data structures used for the new execution plan are different from the data structures used for the execution of the original execution plan. In this case, to reuse the intermediate results, the intermediate results are transformed from the original format to the new format required by the new execution plan. For example, a single large has table used by an in-memory operator may be different from a partitioned hash table used by a spooling operator. In some implementations, the cost of recomputing the intermediate results from scratch is compared to the cost of transforming the existing intermediate data to determine how the operator tree is recompiled (recompile the whole operator tree or just the portion that was not fully executed the first time).

In some implementations, if there are two or more operations in progress, and it is determined that at least one of the active operators is close to completion, the query execution module 234 selects one or more threads of execution to abort and lets at least one of the active operators run to completion. In this way, additional intermediate results may be made available for the execution of the recompiled execution plan.

To be able to run multiple spooling queries at the same time, some implementations have one buffer manager per session. The buffer manger is created if needed and spools to a temporary file. A single buffer manager generally does not allow parallelism, so implementations typically have a separate buffer manager per session. This avoids having multiple spooling queries competing on the same buffer manager.

In some implementations, the spooling operators do not implement intra-query parallelism, so the operators in the query are executed serially. In other implementations, the spooling operators can execute in parallel, so the execution plans are created to take advantage of the parallelism. Because spooling operators are limited by disk speed, lack of parallelism is typically not a huge factor. Even for implementations that do not execute an individual query in parallel do allow multiple queries to be executed in parallel.

As noted above, spooling can be implemented on a coarse level or a finer level. Some implementations have a session setting that specifies whether to use spooling operators. This is initialized with the same value as the global setting. In this case, the global setting is a default value that can be overridden by the session setting. In addition, whether to use in-memory or spooling operators can be determined on an individual operator basis based (either at compile time or at run time) on more specific information about an individual operator. For example, if a query has one operator that will create a very large hash table, the execution plan may specify a spooling operator for this, but otherwise use in-memory operators. As another example, when memory runs out during the execution of one specific operator, some implementations replace only the one offending operator with a spooling operator during recompilation. In some implementations, various metadata from the database may be used to determine which operators are implemented with in-memory operators (e.g., metadata about the tables used in the query and/or metadata about previous queries using one or more of the same tables). In some implementations, there is a default setting per operator.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method for dynamically selecting query execution operators, comprising:
at a computing device having one or more processors, volatile memory, and non-volatile memory, executing one or more programs to retrieve data from a database, including:
receiving a query;
parsing the query to form a query execution tree;
compiling the query execution tree to form a first executable plan that includes a plurality of in-memory operators that execute within the volatile memory without swapping to the non-volatile memory;
initiating execution of the first executable plan including the plurality of in-memory operators;
for each operator of the plurality of in-memory operators:
determining if there is insufficient memory to complete execution of the respective in-memory operator;
in accordance with a determination that there is insufficient memory to complete execution of the respective in-memory operator:
aborting execution of the first executable plan;
recompiling the query execution tree to form a second executable plan that includes a plurality of spooling operators instead of the in-memory operators, wherein each of the spooling operators executes within a respective fixed volatile memory budget and is configured to swap to non-volatile memory according to the respective fixed volatile memory budget; and
executing the second executable plan, including the plurality of spooling operators, to identify a set of results from the database that is responsive to the query; and
in accordance with a determination that there is sufficient memory to complete execution of the respective in-memory operator, executing the first executable plan to identify the set of results from the database that is responsive to the query; and
returning the set of results.

2. The method of claim 1, wherein recompiling the query execution tree includes replacing the respective in-memory operator with a corresponding spooling operator in the second executable plan, and wherein the second executable plan includes one or more in-memory operators.

3. The method of claim 1,
wherein aborting execution of the first executable plan includes:
identifying a first portion of the query execution tree that has completed execution before the detection of insufficient memory; and
storing intermediate results corresponding to the first portion;
wherein recompiling the query execution tree comprises recompiling all of the query execution tree except the first portion; and
wherein executing the second executable plan includes reusing the stored intermediate results.

4. The method of claim 3, wherein data storage for the first executable plan is in a first format that is different from a second data storage format used by the second executable plan, and storing the intermediate results comprises transforming data from the first format to the second format.

5. The method of claim 1, wherein:
the respective in-memory operator is a hash join that builds a hash table within the volatile memory;
the respective in-memory operator is replaced by a corresponding spooling operator in the second executable plan; and
the corresponding spooling operator utilizes a partitioned hash table that swaps partitions between volatile memory and non-volatile memory.

6. The method of claim 1, wherein the first executable plan further includes a second spooling operator configured to execute within a second fixed volatile memory budget.

7. The method of claim 6, wherein compiling the query execution tree to form the first executable plan includes:
identifying two or more tables from the database that are to be joined according to the query execution tree;
estimating hash table size according to database statistics for the two or more tables;
determining that the estimated hash table size exceeds a predefined threshold value; and
in accordance with the determination, assigning the second spooling operator to perform the join as part of the first executable plan.

8. A computing device, comprising:
one or more processors;
volatile memory;
non-volatile memory; and
one or more programs stored in the volatile memory and configured for execution by the one or more processors, the one or more programs comprising instructions for:
receiving a query;
parsing the query to form a query execution tree;
compiling the query execution tree to form a first executable plan that includes a plurality of in-memory operators that execute within the volatile memory without swapping to the non-volatile memory;
initiating execution of the first executable plan including the plurality of in-memory operators;
for each operator of the plurality of in-memory operators:
determining if there is insufficient memory to complete execution of the respective in-memory operator;
in accordance with a determination that there is insufficient memory to complete execution of the respective in-memory operator:
aborting execution of the first executable plan;
recompiling the query execution tree to form a second executable plan that includes a plurality of spooling operators instead of the in-memory operators, wherein each of the spooling operators executes within a respective fixed volatile memory budget and is configured to swap to non-volatile memory according to the respective fixed volatile memory budget;
executing the second executable plan, including the plurality of spooling operators, to identify a set of results from the database that is responsive to the query; and
in accordance with a determination that there is sufficient memory to complete execution of the respective in-memory operator, executing the first executable plan to identify the set of results from the database that is responsive to the query; and
returning the set of results.

9. The computing device of claim 8, wherein recompiling the query execution tree includes replacing the respective in-memory operator with a corresponding spooling operator in the second executable plan, and wherein the second executable plan includes one or more in-memory operators.

10. The computing device of claim 8,
wherein aborting execution of the first executable plan includes:
identifying a first portion of the query execution tree that has completed execution before the detection of insufficient memory; and
storing intermediate results corresponding to the first portion;
wherein recompiling the query execution tree comprises recompiling all of the query execution tree except the first portion; and
wherein executing the second executable plan includes reusing the stored intermediate results.

11. The computing device of claim 10, wherein data storage for the first executable plan is in a first format that is different from a second data storage format used by the second executable plan, and storing the intermediate results comprises transforming data from the first format to the second format.

12. The computing device of claim 8, wherein:
the respective in-memory operator is a hash join that builds a hash table within the volatile memory;
the respective in-memory operator is replaced by a corresponding spooling operator in the second executable plan; and
the corresponding spooling operator utilizes a partitioned hash table that swaps partitions between volatile memory and non-volatile memory.

13. The computing device of claim 8, wherein the first executable plan further includes a second spooling operator configured to execute within a second fixed volatile memory budget.

14. The computing device of claim 13, wherein compiling the query execution tree to form the first executable plan includes:
identifying two or more tables from the database that are to be joined according to the query execution tree;
estimating hash table size according to database statistics for the two or more tables;
determining that the estimated hash table size exceeds a predefined threshold value; and
in accordance with the determination, assigning the second spooling operator to perform the join as part of the first executable plan.

15. A non-transitory computer readable storage medium storing one or more programs configured for execution by a computing device having one or more processors, volatile memory, and non-volatile memory, the one or more programs comprising instructions for:
receiving a query;
parsing the query to form a query execution tree;
compiling the query execution tree to form a first executable plan that includes a plurality of in-memory operators that execute within the volatile memory without swapping to the non-volatile memory;
initiating execution of the first executable plan including the plurality of in-memory operators;
for each operator of the plurality of in-memory operators:
determining if there is insufficient memory to complete execution of the respective in-memory operator;
in accordance with a determination that there is insufficient memory to complete execution of the respective in-memory operator:
aborting execution of the first executable plan;
recompiling the query execution tree to form a second executable plan that includes a plurality of spooling operators instead of the in-memory operators, wherein each of the spooling operators executes within a respective fixed volatile memory budget and is configured to swap to non-volatile memory according to the respective fixed volatile memory budget; and
executing the second executable plan, including the plurality of spooling operators, to identify a set of results from the database that is responsive to the query; and
in accordance with a determination that there is sufficient memory to complete execution of the respective in-memory operator, executing the first executable plan to identify the set of results from the database that is responsive to the query; and
returning the set of results.

16. The computer readable storage medium of claim 15, wherein recompiling the query execution tree includes replacing the respective in-memory operator with a corresponding spooling operator in the second executable plan, and wherein the second executable plan includes one or more in-memory operators.

17. The computer readable storage medium of claim 15, wherein aborting execution of the first executable plan includes:
identifying a first portion of the query execution tree that has completed execution before the detection of insufficient memory; and
storing intermediate results corresponding to the first portion;
wherein recompiling the query execution tree comprises recompiling all of the query execution tree except the first portion; and
wherein executing the second executable plan includes reusing the stored intermediate results.

18. The computer readable storage medium of claim 17, wherein data storage for the first executable plan is in a first format that is different from a second data storage format used by the second executable plan, and storing the intermediate results comprises transforming data from the first format to the second format.

19. The computer readable storage medium of claim 15, wherein:
the respective in-memory operator is a hash join that builds a hash table within the volatile memory;
the respective in-memory operator is replaced by a corresponding spooling operator in the second executable plan; and
the corresponding spooling operator utilizes a partitioned hash table that swaps partitions between volatile memory and non-volatile memory.

20. The computer readable storage medium of claim 15, wherein the first executable plan further includes a second spooling operator configured to execute within a second fixed volatile memory budget, and wherein compiling the query execution tree to form the first executable plan includes:
identifying two or more tables from the database that are to be joined according to the query execution tree;
estimating hash table size according to database statistics for the two or more tables;

determining that the estimated hash table size exceeds a predefined threshold value; and in accordance with the determination, assigning the second spooling operator to perform the join as part of the first executable plan.

* * * * *